though these compounds were previously described in the art, it is believed that they have not been produced in the yields disclosed in the present process. The cyclic compound 2,2,4,4-tetrakis(difluoramino)-1,3-diazetidine was described in U.S. application Ser. No. 284,225 filed May 29, 1963 and now abandoned. 2,2,4,4-tetrakis(difluoramino)-1,3-diazetidine is a cyclic compound and is also named 1,1,3,3-tetrakis(difluoramino)-2,4-diazacyclobutane.

United States Patent Office 3,663,621
Patented May 16, 1972

3,663,621
FLUORINATION PROCESS FOR PREPARING CERTAIN DIFLUORAMINO COMPOUNDS
Donald L. Esmay, Coon Rapids, Minn., assignor to Minnesota Mining and Manufacturing Company, St. Paul, Minn.
No Drawing. Continuation-in-part of application Ser. No. 531,654, Feb. 21, 1966. This application Sept. 11, 1967, Ser. No. 668,741
Int. Cl. C07c 87/22
U.S. Cl. 260—583 NH                7 Claims

ABSTRACT OF THE DISCLOSURE

Fluorination process especially adapted for the production of highly fluorinated oxidant compounds comprising the steps of forming an adduct between ammonia and a substituted fluorimino compound in solution in an alkyl nitrile, at relatively low temperatures, then adding to this reaction mixture an inert fluorocarbon solvent, followed by direct fluorination by contacting the adduct-solvent mixture with fluorine at a temperature less than 0° C. The process produces improved yields in larger scale reactions.

This application is a continuation-in-part of prior copending application Ser. No. 531,654, filed Feb. 21, 1966, now abandoned.

BACKGROUND OF THE INVENTION (1) Field of the invention

This invention relates to processes for production of fluorinated compounds.

(2) Description of the prior art

The preparation of highly fluorinated compounds on a small scale is known, but production in larger amounts presents many practical difficulties. As the compounds are very energetic oxidizers, the likelihood of explosions and low yields increases, and becomes more serious as production is scaled up.

SUMMARY OF THE INVENTION

This invention contemplates provision of a process for larger scale production of highly fluorinated oxidant compounds.

In accordance with the present invention, a process is provided for production of highly fluorinated oxidants, and specifically, tetrakis(difluoramino)methane and related compounds, which diminishes difficulties so that pilot plant and/or large scale production is feasible.

The process of the invention involves the production of an adduct between ammonia and a fluorimino compound which is free from reducing substituents, followed by direct fluorination of the adduct to form a compound having increased oxidizing capability.

Noncompatible substituent groups which must not be present in the fluorimino compound are those which are strongly reducing in nature.

A criterion for determining the compatibility of functionally reducing substituents in the fluorimino compound is the single electrode potential of the oxidation-reduction couple of which the substituent in the reduced form is measured against a normal hydrogen electrode. Using this convention, the single electrode potential of the iodide to couple is —0.53 volt. Compatible substituents of this type include those which have measured or calculated potentials more negative than —0.6 volt, under the conditions in which the fluorimino group-containing compounds are manipulated. On the other hand, substituents of this type which would normally have a potential less negative than —0.6 volt (say up to +0.5 volt or even higher) will be compatible in the process of the invention when the temperature of preparation, or the solvent used; or the physical state of the final product, are such that the kinetics of decomposition control the rate to an acceptable degree.

Illustrative of these strongly reducing groups are those which contain reactive metal to carbon and metal to hydrogen bond; pi-bonded metallo-organic moieties; ionically bonded iodide, sulfide and polysulfide; polyhydroxy groups in aromatic nuclei; and inorganic groups which contain trivalent phosphorous, monovalent copper, or any element above atomic number 22 in a reduced valence state.

Functional groups commonly known to the art which can be present in the starting compounds for the process of this invention can be hydroxy, azo, azoxy, cyanate, amino, imino, cyano, halogeno, tetrazolyl, alkoxy, alkylthio, oxo, nitroso, ureido and the like, as well as oxidizing groups such as nitro, difluoramino, fluorimino, chloramino, peroxy and the like.

Broadly speaking, the process of the invention for the preparation of highly fluorinated oxidant compounds comprises (A) Reacting ammonia and a substituted fluorimine of the formula $$Z'-\underset{\underset{Z}{|}}{C}=NF$$

wherein Z is $-R_f$, $-OR$, $-NFR_f$, $-NF_2$, $-CN$, $-SF_5$,

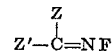

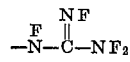

$-N=N-C(=NF)NF_2$, $-F$, $-Br$, $-Cl$ or $-N_3$; Z' is $-NF_2$ or $-CN$; $R_f$ is a highly fluorinated alkyl group having 1 to 8 carbon atoms; and R is an alkyl group having 1 to 8 carbon atoms in a solvent of the group consisting of lower alkyl nitriles at a temperature below 0° C. and above the melting point of the nitrile to form an adduct of the formula $$Z''-\underset{\underset{NH_2}{|}}{\overset{Z'}{C}}-NFH$$

wherein Z' has the significance set out above and Z" is

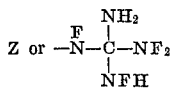

(B) Adding to the reaction mixture a fluorocarbon solvent inert towards the adduct and fluorine; and (C) contacting the said adduct-solvent mixture with fluorine at a temperature less than 0° C. and above the melting point of the mixture.

The highly fluorinated alkyl groups are characterized by replacement of at least about 80 percent of all of the available hydrogen atoms by fluorine. During the ensuing reaction (step C) at least one hydrogen atom bonded to nitrogen in the precursor adduct is replaced by fluorine.

The products of the process contain a plurality of fluorinated nitrogen atoms and have increased oxidizing power as compared with the starting materials. The fluorinated products are isolated by known procedures, e.g. chromatography.

It has been found that improved yields of the desired product are obtained by carrying out step A of the preparation in solution in an alkyl nitrile, then adding an inert fluorocarbon solvents and carrying out the fluorination step in the mixture of solvents. It is preferred to add a scavenger for hydrogen fluoride, e.g. sodium fluoride, to the reaction mixture in the fluorination step, in order to remove the hydrogen fluoride which is formed.

The lower alkyl nitriles which can be used as solvents for the first step in the process are those containing from 2 to 6 carbon atoms, and which melt below 0° C. These nitriles exhibit good solvent or dispersant properties for the components of the mixture.

Inert fluorocarbon solvents useful for the process include perfluorinated ethers, perfluorinated hydrocarbons such as perfluorooctanes, perfluorohexanes and the like; perfluorocyclohexane; perfluorinated cyclic ethers such as perfluorobutylfuran; perfluorinated tertiary amines such as tris(perfluoro-n-butyl)amine; and the like. Commercially obtainable fluorocarbons may contain an amount of material which is not inert toward fluorine. In such cases, fluorine gas is passed through the selected fluorocarbon liquid for a time in small amounts sufficient to render it susbtantially completely inert toward fluorine.

The fluorocarbon solvent is added to the alkyl nitrile-adduct mixture in amount of about 40–60 percent by volume. It serves to repress the tendency of the fluorine to attack the alkyl nitrile, so that the nitrile need not be removed from the reaction mixture after formation of the adduct. This is very advantageous in this process, where very energetic, shock sensitive materials must be handled.

In carrying out the process, temperatures ranging from about —120° to about 0° C. are used in step 1, —100° to —10° C. being the preferred range, but in any case above the melting point of the nitrile. In step 2, the temperatures can range from just above the melting point of the solvent mixture to 0° C., with fluorination preferably being conducted at about —40° to —20° C. Flourination is accomplished by use of 5 to 50 perecnt by weight of fluorine in an inert gas, e.g. nitrogen, argon, helium or the like. The lower concentrations of fluorine require longer exposure time.

DESCRIPTION OF THE PREFERRED EMBODIMENTS

The following examples, in which all parts are by weight unless otherwise specified, will more specifically illustrate the process of the invention. Perfluoroguanidine can be prepared by the direct fluorination of dry ammeline with 5 percent fluorine at about —16° C., the products of the process being separated and purified by gas-liquid chromatography using a high-boiling fluoro-chemical liquid as the stationary phase. A number of other materials suitable for use as starting compounds in the present case are also disclosed in the copending application Ser. No. 425,-113, filed Jan. 8, 1965.

Example 1

The preparation of tetrakis(difluoroamino)methane from perfluoroguanidine takes place in two steps, as follows:

(1)  $(F_2N)_2C=NF + NH_3 \rightarrow (F_2N)_2C(NH_2)NFH$

In this step, ammonia and perfluoroguanidine react to form an adduct.

(2)  $(F_2N)_2C(NH_2)NFH + 3F_2 \rightarrow C(NF_2)_4 + 3HF$

In this step, the adduct from step 1 is fluorinated.

The appartaus used in a conventional stainless steel 300-ml. autoclave equipped with a stirrer, gauges, valves, gas line inlet, thermocouple well, liquid sampling line, gaseous product exit line, and a flush-bottom valve. A suitable fluorine-nitrogen supply system is attached to the gas inlet. The gas exit line is valved so that the effluent gases can be passed through a gas chromatograph for analytical monitoring, or passed through a potassium iodide bubbler (to measure unreacted fluorine or equivalent), or passed through a cold trap to remove condensible products. The entire unit is isolated behind protective shielding during operation.

The reactor is cooled to —60° C. and charged with 75 ml. of acetonitrile. While stirring at a moderate speed (300 r.p.m.) at —60° C., there is added (in the gaseous phase) 8.9 g. (0.06 mole) of perfluoroguanidine, which may contain some tris(difluoroamino)-fluoromethane, commonly found in the products of direct fluorination of ammeline. The presence of the tri(difluoramino)fluoromethane does not interfere with the process.

To the perfluoroguanidine solution at —60° C., was added 1.18 g. (0.693 mole) of ammonia in the gaseous phase. After storage overnight at —50° C., analysis of a sample showed that substantially all of the perfluoroguanidine has reacted to form the ammonia adduct. To the reactor was then added a suspension of 3.8 g. of sodium fluoride in 75 ml. of perfluorinated eight-carbon cyclic ethers (a fluorocarbon solvent available under the trademark FC-75).

The reaction mixture was fluorinated at —40° to —45° C. and 26 p.s.i.g. while stirring rapidly (800 r.p.m.) using a 20:80 volume mixture of fluorine:nitrogen. During 7.5 hours about 2.2 equivalents of fluorine were added. Analysis of a sample showed that 2.4 grams (0.011 mole; 18 mole percent yield) of tetrakis(difluoroamino)methane has been produced. The product is isolated and purified, as by gas-liquid chromatography, fractional distillation, solvent extraction, or the like.

Example 2

The compound of the formula,

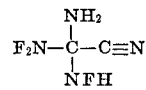

is prepared as follows: Apparatus as described in Example 1 is used. A mixture of 3.4 parts of ammonia and acetonitrile (37 parts) is gradually added under reduced pressure to a stirred solution of 24.6 parts of perfluorocyanoformamidine, $F_2N-C(=NF)C\equiv N$, in about 150 parts of acetonitrile at —60° C. The resulting mixture is stirred at —60° C. for one hour. To the mixture, which contains the desired adduct, is added 250 parts of perfluorinated eight-carbon cyclic ether mixture. The mixture is then allowed to warm to about —35° C. The product can be fluorinated without further purification or isolation. Conveniently, the mixture is stored at —78° C. under a dry nitrogen atmosphere.

Fluorination of the acetonitrile solution-fluorocarbon mixture of the adduct thus prepared is carried out in the reactor at about —35° C. Fluorine in concentration of 3 volume percent in nitrogen is passed through the solution at a metered constant rate from a 3.0 liter cylinder. After 6 hours, a total of about 54.2 parts of fluorine is used. A tube filled with NaF pellets and maintained at 25° C. can be used to remove hydrogen fluoride from the effluent gas. The volatile product (about 9 parts) is collected in two glass traps in series which are cooled with liquid oxygen. The progress of the fluorination can be followed by chromatographic analysis of the effluent gas stream. This analytical technique is conveniently used to determine when the fluorination is completed.

The product contains an amount of acetonitrile as well as tris(difluoramino)acetonitrile. Chromatographic separation of the components, carried out on a 24 ft., ½ inch column composed of 33 percent by weight of the fluorochemical FX–45 on Chromasorb P at 25° C., is employed to isolate the tris(difluoroamino)acetonitrile.

Tris(difluoramino)acetonitrile is a colorless liquid, has a vapor pressure of about 505 millimeters Hg at 23° C.

and boils at about 32° C. Its infrared spectrum exhibits an absorption at 4.42 microns due to the —C≡N group and strong absorptions at about 10.3 microns, 10.6 microns and 11.0 microns which are assigned to the NF$_2$ groups. Its fluorine N.M.R. spectrum exhibits a peak at −38.8$\phi$.

Example 3

Procedures similar to those described in Example 2 are used to prepare tetrakis(difluoramino)methane, $$C(NF_2)_4$$

and other tris(difluoramino)methyl compounds. The adduct, (F$_2$N)$_2$C(NFH)NH$_2$, is prepared by the addition of ammonia to perfluoroguanidine using about 10 ml. of acetonitrile as solvent. The reaction proceeds rapidly even at −60° C. The adduct, with the acetonitrile, is then dissolved in 40 ml. of trifluoroethanol, keeping the temperatures below about −25° C. Fluorine in 20 volume percent concentration in nitrogen is passed through the stirred solution of the adduct at about −40° C. for about 5 hours, until 1.5 mole of fluorine has been delivered for each 0.1 mole of adduct. The product which collects in 70 traps cooled with liquid air is separated into its various components by gas-liquid chromatography using, for example, an 18 foot, ½ inch column composed of 33 percent by weight of Kel-F oil 8126 on acid-washed Chromasorb P, and operated at room temperature. Tris(difluor-amino)fluoromethane and tetrakis(difluoramino)methane are isolated. The retention value (T$_R$) for C(NF$_2$)$_4$ is 160, using CFCl$_3$ as a reference of 100. Other columns such as a column composed of 20 percent by weight of the fluorine-containing silastic FS-1265 (Dow Corning) on Chromasorb P can be used.

Additional examples for the formation of fluorinated oxidants by the process of this invention using various adducts of ammonia and trifluoroformamidino compounds are shown in Table I. Thus, for example, the adduct of ammonia and azotrifluoroformamidine $$(NF_2C(=NF)-N=N-C(=NF)NF_2)$$

yields (NF$_2$)$_3$C—N=N—C(NF$_2$)$_3$ upon fluorination. The process steps and solvents used are those shown in Example 1.

TABLE I

| Ex. | Trifluoroformamidino compound | Ammonia adduct | Tris(difluoramino)-methyl compound |
|---|---|---|---|
| 4 | CF$_3$NFC(=NF)NF$_2$ | NFH<br>CF$_3$NFC—NF$_2$<br>\|<br>NH$_2$ | CF$_3$NFC(NF$_2$)$_3$ |
| 5 | ClC(=NF)NF$_2$ | NFH<br>ClC—NF$_2$<br>\|<br>NH$_2$ | ClC(NF$_2$)$_3$ |
| 6 | CF$_3$C(=NF)NF$_2$ | NFH<br>CF$_3$C—NF$_2$<br>\|<br>NH$_2$ | CF$_3$C(NF$_2$)$_3$ |
| 7 | CF$_3$CF$_2$CF$_2$C(=NF)NF$_2$ | NFH<br>CF$_3$CF$_2$CF$_2$C—NF$_2$<br>\|<br>NH$_2$ | CF$_3$CF$_2$CF$_2$C(NF$_2$)$_3$ |
| 8 | BrC(=NF)NF$_2$ | NFH<br>BrC—NF$_2$<br>\|<br>NH$_2$ | BrC—(NF$_2$)$_3$ |
| 9 | N$_3$C(=NF)NF$_2$ | NFH<br>N$_3$C—NF$_2$<br>\|<br>NH$_2$ | N$_3$C(NF$_2$)$_3$ |
| 10 | FC(=NF)NF$_2$ | NFH<br>FC—NF$_2$<br>\|<br>NH$_2$ | F—C(NF$_2$)$_3$ |
| 11 | NF<br>\|\|<br>C$_2$H$_5$OC—NF$_2$ | NFH<br>C$_2$H$_5$OC—NF$_2$<br>\|<br>NH$_2$ | C$_2$H$_5$OC—(NF$_2$)$_3$ |
| 12 | CF$_3$NFC(=NF)NF$_2$ | NFH<br>CF$_3$NFC—NF$_2$<br>\|<br>NH$_2$ | CF$_3$NFC(NF$_2$)$_3$ |
| 13 | NF  NF<br>\|\|  \|\|<br>NF$_2$—C—NF—C—NF$_2$ | NFH  NFH<br>NF$_2$C—NF—C—NF$_2$<br>\|    \|<br>NH$_2$  NH$_2$ | (NF$_2$)$_3$C—NF—C(NF$_2$)$_3$ |
| 14 | F$_2$NC(=NF)NF$_2$ | NFH<br>F$_2$NC—NF$_2$<br>\|<br>NH$_2$ | HNFC(NF$_2$)$_3$<br>and<br>H$_2$NC(NF$_2$)$_3$ |

The starting materials and adducts formed in the first step of the process, and the products, e.g. tetrakis(difluoramino)methane, are highly energetic, explosive, impact-sensitive materials. Consequently, precautions to safeguard against dangerous explosions such as protective clothing and the use of shields and barricades must be observed during handling of these materials and while carrying out the preparations.

The highly fluorinated oxident products of the process of the invention are useful as ingredients in rocket propellant motors.

What is claimed is:

1. The process for the preparation of highly fluorinated oxidant compounds which comprises
   (A) reacting ammonia and a substituted fluorimine of the formula $$Z'-\underset{\underset{Z}{|}}{C}=NF$$

wherein Z is $-R_f$, $-OR$, $-NFR_f$, $-NF_2$, $-CN$, $SF_5$,

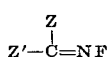

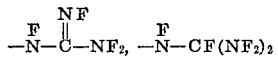

$-N=N-C(=NF)NF_2$, $-F$, $-Br$, $-Cl$ or $-N_3$; Z' is $-NF_2$ or $-CN$; $R_f$ is a highly fluorinated group having 1 to 8 carbon atoms; and R is an alkyl group having 1 to 8 carbon atoms in a solvent of the group consisting of lower alkyl nitriles at a temperature below 0° C. and above the melting point of the nitrile to form an adduct of the formula

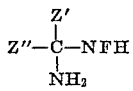

wherein Z' has the significance set out above and Z'' is Z or

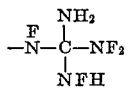

(B) adding to the reaction mixture a fluorocarbon solvent inert towards the adduct and fluorine; and
   (C) contacting the said adduct-solvent mixture with fluorine at a temperature less than 0° C. and above the melting point of the mixture.

2. The process according to claim 1, in which the alkyl nitrile is acetonitrile.

3. The process for producing tetrakis(difluoramino) methane which comprises:
   (A) forming a reaction mixture containing an adduct by bringing together ammonia and perfluoroguanidine in a solvent of the group consisting of lower alkyl nitriles at a temperature below 0° C. and above the melting point of the nitrile;
   (B) adding to the reaction mixture a fluorocarbon solvent inert towards the adduct and fluorine; and
   (C) contacting the said adduct-solvent mixture with fluorine at a temperature less than 0° C. and above the melting point of the mixture.

4. The process according to claim 3, in which the alkyl nitrile contains 2 to 6 carbon atoms and melts below 0° C.

5. The process according to claim 3, in which the nitrile is acetonitrile.

6. The process according to claim 3, in which the temperature of adduct formation is in the range of about $-100°$ C. to $-10°$ C. and the temperature of fluorination is in the range of about $-40°$ to $-20°$ C.

7. The process according to claim 3, in which the mixture which is fluorinated contains a scavengger for hydrogen fluoride.

References Cited

UNITED STATES PATENTS

| | | | |
|---|---|---|---|
| 3,215,709 | 11/1965 | Logothetis | 260—349 |
| 3,337,605 | 8/1967 | Sausen | 260—465.5 |
| 3,347,829 | 10/1967 | MacDonald | 260—64 |
| 3,354,011 | 11/1967 | Kroon et al. | 149—22 |
| 3,367,968 | 2/1968 | Hoekstra | 260—564 |
| 3,387,033 | 6/1968 | Talbott et al. | 260—583 |

OTHER REFERENCES

Mitsch, J. Am. Chem. Soc., vol. 87, pp. 328-333 (195).

LELAND A. SEBASTIAN, Primary Examiner

U.S. Cl. X.R.

149—109; 206—349, 465.5 R, 564 R, 584 C, 585 R